US008589338B2

(12) United States Patent
Maes

(10) Patent No.: US 8,589,338 B2
(45) Date of Patent: Nov. 19, 2013

(54) SERVICE-ORIENTED ARCHITECTURE (SOA) MANAGEMENT OF DATA REPOSITORY

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 135 days.

(21) Appl. No.: 12/019,299

(22) Filed: Jan. 24, 2008

(65) Prior Publication Data

US 2009/0193057 A1    Jul. 30, 2009

(51) Int. Cl.
*G06F 7/00* (2006.01)
*G06F 17/00* (2006.01)
*G06F 17/30* (2006.01)

(52) U.S. Cl.
USPC ........... 707/608; 707/707; 709/229; 715/742; 715/745

(58) Field of Classification Search
USPC ................. 707/600, 602, 608, 706, 707, 733; 709/206, 219, 224, 225, 228; 715/741, 715/742, 743, 745
See application file for complete search history.

(56) References Cited

U.S. PATENT DOCUMENTS

| 5,414,812 A | 5/1995 | Filip et al. |
|---|---|---|
| 5,613,060 A | 3/1997 | Britton et al. |
| 5,699,513 A | 12/1997 | Feigen et al. |
| 5,737,321 A | 4/1998 | Takahashi |
| 5,786,770 A | 7/1998 | Thompson |
| 5,850,517 A | 12/1998 | Verkler et al. |
| 5,867,665 A * | 2/1999 | Butman et al. ................ 709/239 |
| 5,946,634 A | 8/1999 | Korpela |
| 6,115,690 A * | 9/2000 | Wong .................................. 705/7 |
| 6,119,104 A * | 9/2000 | Brumbelow et al. ........... 186/37 |
| 6,128,645 A * | 10/2000 | Butman et al. ................ 709/203 |
| 6,157,941 A | 12/2000 | Verkler et al. |
| 6,163,800 A | 12/2000 | Ejiri |
| 6,192,414 B1 | 2/2001 | Horn |
| 6,230,271 B1 | 5/2001 | Wadlow et al. |
| 6,272,556 B1 | 8/2001 | Gish |
| 6,275,857 B1 | 8/2001 | McCartney |

(Continued)

FOREIGN PATENT DOCUMENTS

EP          2 034 748 A1    3/2009
WO    WO 2007134468 A1   11/2007

OTHER PUBLICATIONS

U.S. Appl. No. 11/024,160, filed Dec. 2004, Maes.

(Continued)

*Primary Examiner* — Vincent F Boccio
(74) *Attorney, Agent, or Firm* — Kilpatrick Townsend & Stockton LLP

(57) ABSTRACT

A data repository includes information for multiple data systems, which can each control data in this and a number of other domains. A business process can be launched by one of the data systems to update the target data and any related data in the repository or any other related repository. Any request to update data is intercepted and the business process can launch workflows and apply policies as needed to process the request. Workflows can be associated with the fields being updated or process being executed, such that any update to the target data is also accurately reflected in any other related system. Further, launching a workflow allows processes to be run before the data is updated, such that the data can be modified, added to, rejected, or otherwise processed before being added to the appropriate repositories.

22 Claims, 7 Drawing Sheets

(56) References Cited

U.S. PATENT DOCUMENTS

| | | |
|---|---|---|
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 * | 6/2003 | Kitagawa et al. ...... 707/999.202 |
| 6,611,812 B2 * | 8/2003 | Hurtado et al. ................. 705/26 |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,868,413 B1 * | 3/2005 | Grindrod et al. ....... 707/999.003 |
| 6,965,902 B1 | 11/2005 | Ghatate |
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,072,653 B1 | 7/2006 | Sladek et al. |
| 7,073,055 B1 | 7/2006 | Freed et al. |
| 7,089,317 B2 | 8/2006 | Jeyaraman et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,272,625 B1 | 9/2007 | Hannel et al. |
| 7,281,029 B2 * | 10/2007 | Rawat ........................... 715/209 |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,443,972 B1 | 10/2008 | Barlow et al. |
| 7,447,793 B2 | 11/2008 | Morioka |
| 7,448,022 B1 | 11/2008 | Ram et al. |
| 7,454,399 B2 * | 11/2008 | Matichuk ........................ 706/53 |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,660,297 B2 | 2/2010 | Fisher et al. |
| 7,676,813 B2 | 3/2010 | Bisset et al. |
| 7,716,310 B2 | 5/2010 | Foti |
| 7,720,926 B2 | 5/2010 | Asahara |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,925,727 B2 | 4/2011 | Sullivan et al. |
| 7,933,397 B2 | 4/2011 | Jain |
| 8,023,971 B2 | 9/2011 | Egli |
| 8,032,920 B2 | 10/2011 | Maes |
| 8,036,362 B1 | 10/2011 | Skinner |
| 8,068,860 B1 | 11/2011 | Midkiff |
| 8,073,810 B2 | 12/2011 | Maes |
| 8,090,848 B2 | 1/2012 | Maes |
| 8,114,555 B2 | 2/2012 | Leonida et al. |
| 8,121,278 B2 | 2/2012 | Leigh et al. |
| 8,161,171 B2 | 4/2012 | Maes |
| 8,214,503 B2 | 7/2012 | Maes |
| 8,230,449 B2 | 7/2012 | Maes |
| 8,255,470 B2 | 8/2012 | Jackson et al. |
| 2001/0016880 A1 | 8/2001 | Cai et al. |
| 2001/0028649 A1 | 10/2001 | Pogossiants et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0120502 A1 | 6/2003 | Robb et al. |
| 2003/0131076 A1 | 7/2003 | Nelson et al. |
| 2003/0135553 A1 | 7/2003 | Pendakur |
| 2003/0140115 A1 * | 7/2003 | Mehra ........................... 709/217 |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0093593 A1 | 5/2004 | Jhanwar et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0153545 A1 | 8/2004 | Pandaya et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 * | 4/2005 | Hailwood et al. ................ 705/40 |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031559 A1 | 2/2006 | Sorokopud et al. |
| 2006/0036689 A1 | 2/2006 | Buford et al. |

(56) References Cited

U.S. PATENT DOCUMENTS

| | | |
|---|---|---|
| 2006/0041669 A1 | 2/2006 | Bemmel et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1* | 7/2006 | Dua .............................. 370/352 |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0150480 A1 | 6/2007 | Hwang et al. |
| 2007/0150936 A1 | 6/2007 | Maes |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0080479 A1 | 4/2008 | Maes |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0112875 A1 | 4/2009 | Maes |
| 2009/0119303 A1 | 5/2009 | Rio et al. |
| 2009/0125595 A1 | 5/2009 | Maes |
| 2009/0132717 A1 | 5/2009 | Maes |
| 2009/0187919 A1 | 7/2009 | Maes |
| 2009/0190603 A1 | 7/2009 | Damola et al. |
| 2009/0193057 A1* | 7/2009 | Maes ........................... 707/200 |
| 2009/0193433 A1 | 7/2009 | Maes |
| 2009/0201917 A1 | 8/2009 | Maes et al. |
| 2009/0222541 A1 | 9/2009 | Monga et al. |
| 2009/0228584 A1 | 9/2009 | Maes et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |
| 2010/0128696 A1 | 5/2010 | Fantini et al. |
| 2010/0153865 A1 | 6/2010 | Barnes et al. |
| 2010/0185772 A1 | 7/2010 | Wang et al. |
| 2010/0192004 A1 | 7/2010 | Bauchot et al. |
| 2010/0281488 A1 | 11/2010 | Krishnamurthy et al. |
| 2011/0035443 A1 | 2/2011 | Jensen |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2012/0045040 A1 | 2/2012 | Maes |
| 2012/0047506 A1 | 2/2012 | Maes |
| 2012/0173745 A1 | 7/2012 | Maes |

OTHER PUBLICATIONS

Andrews, Tony et al, Business Process Execution Language for Web Services, Version 1.1, BEA Systems, International Business Machines Corporation, SAP AG, Siebel Systems, May 5, 2003, 31 pages.

Liberty Architecture Overview, Liberty Alliance Project Version 1.1, Piscataway New Jersey, Jan. 15, 2003, 44 pages.

Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.

Maes, Stephanie, Multi-modal Web IBM Position W3C/WAP Workshop, IBM Research Human Language Technologies, downloaded http://www.w3.org on May 26, 2003, 9 pages.

Parlay APIs 4.0, Parlay X Web Services White Paper, The Parlay Group, Parlay X Working Group, Dec. 16, 2002, 12 pages.

Policy-Based Management Tom Sheldon's Linktionary, downloaded http://www.linktionary.com/policy.html on Aug. 2, 2004, 4 pages.

Seely, Scott, "XML and Web Services Security: Understanding WS-Security", Microsoft Corporation, 2002.

Simpson et al, Java Product Review—Oracle EDA Suite, Dec. 4, 2006, Open Source Magazine, pp. 1-10.

(56) References Cited

OTHER PUBLICATIONS

Single Sign on Deployment Guide, Introduction to Single-Sign-On, Netscape 6 Documentation Training Manual http://developer.netscape.com/docs/manuals/security/SSO/sso.htm on May 26, 2003, 5 Pages.

Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Thomas Manes, Anne, "Registering a Web Service in UDDI", 2003.

U.S. Appl. No. 11/848,347, filed Aug. 31, 2007, Final Office Action mailed May 10, 2010, 15 pages.

U.S. Appl. No. 11/877,129, filed Oct. 23, 2007, Advisory Action mailed Jun. 3, 2010, 2 pages.

U.S. Appl. No. 11/926,738, filed Oct. 29, 2007, Final Office Action mailed Jun. 29, 2010, 12 pages.

U.S. Appl. No. 11/951,500, filed Dec. 6, 2007, Advisory Action mailed Jun. 24, 2010, 2 pages.

U.S. Appl. No. 10/855,999, filed May 28, 2004, Office Action dated Jun. 24, 2010, 20 pages.

U.S. Appl. No. 10/855,999, filed May 28, 2004, Advisory Action dated Feb. 16, 2010, 3 pages.

U.S. Appl. No. 10/855,999, filed May 28, 2004, Advisory Action dated Feb. 2, 2009, 3 pages.

U.S. Appl. No. 10/855,999, filed May 28, 2004, Final Office Action dated Nov. 19, 2008, 12 pages.

U.S. Appl. No. 10/855,999, filed May 28, 2004, Final Office Action dated Nov. 23, 2009, 19 pages.

U.S. Appl. No. 10/855,999, filed May 28, 2004, Office Action dated Apr. 15, 2009, 13 pages.

U.S. Appl. No. 10/855,999, filed May 28, 2004, Office Action dated May 1, 2008, 9 pages.

U.S. Appl. No. 11/070,317, filed Mar. 1, 2005, Advisory Action dated May 19, 2009, 3 pages.

U.S. Appl. No. 11/070,317, filed Mar. 1, 2005, Final Office Action dated Feb. 2, 2010, 8 pages.

U.S. Appl. No. 11/070,317, filed Mar. 1, 2005, Final Office Action dated Mar. 4, 2009, 16 pages.

U.S. Appl. No. 11/070,317, filed Mar. 1, 2005, Office Action dated Apr. 30, 2010, 9 pages.

U.S. Appl. No. 11/070,317, filed Mar. 1, 2005, Office Action dated Aug. 18, 2009, 21 pages.

U.S. Appl. No. 11/070,317, filed Mar. 1, 2005, Office Action dated Aug. 5, 2008, 18 pages.

U.S. Appl. No. 11/130,636, filed May 16, 2005, Office Action dated Mar. 23, 2010, 6 pages.

U.S. Appl. No. 11/130,636, filed May 16, 2005, Office Action dated Sep. 18, 2009, 13 pages.

U.S. Appl. No. 12/045,220, filed Mar. 10, 2008, Advisory Action dated Jun. 11, 2010, 3 pages.

U.S. Appl. No. 12/045,220, filed Mar. 10, 2008, Final Office Action dated Apr. 2, 2010, 19 pages.

U.S. Appl. No. 12/045,220, filed Mar. 10, 2008, Office Action dated Oct. 2, 2009, 18 pages.

U.S. Appl. No. 11/848,347, filed Aug. 31, 2007, Office Action mailed Oct. 29, 2009, 12 pages.

U.S. Appl. No. 11/951,500, filed Dec. 6, 2007, Office Action mailed Sep. 22, 2009, 24 pages.

U.S. Appl. No. 11/951,500, filed Dec. 6, 2007, Final Office Action mailed Mar. 30, 2010, 26 pages.

U.S. Appl. No. 11/877,129, filed Oct. 23, 2007, Office Action mailed Sep. 28, 2009, 15 pages.

U.S. Appl. No. 11/877,129, filed Oct. 23, 2007, Final Office Action mailed Mar. 29, 2010, 17 pages.

U.S. Appl. No. 11/926,738, filed Oct. 29, 2007, Office Action mailed Feb. 24, 2010, 12 pages.

U.S. Appl. No. 11/943,101, filed Nov. 20, 2007, Office Action mailed Jul. 8, 2009, 9 pages.

U.S. Appl. No. 11/943,101, filed Nov. 20, 2007, Final Office Action mailed Feb. 2, 2010, 9 pages.

U.S. Appl. No. 11/943,101, filed Nov. 20, 2007, Advisory Action mailed Apr. 16, 2010, 3 pages.

International Search Report and Written Opinion of PCT/US2010/037074 mailed Jun. 1, 2011, 16 pages.

U.S. Appl. No. 11/848,347, filed Aug. 31, 2007, Advisory Action mailed May 23, 2011, 3 pages.

U.S. Appl. No. 11/926,738, filed Oct. 29, 2007, Advisory Action mailed May 25, 2011, 3 pages.

U.S. Appl. No. 11/943,101, filed Nov. 20, 2007, Advisory Action mailed Apr. 28, 2011, 3 pages.

U.S. Appl. No. 11/951,500, filed Dec. 6, 2007, Final Office Action mailed Apr. 14, 2011, 33 pages.

U.S. Appl. No. 11/024,160, filed Dec. 27, 2004, Final Office Action dated Jun. 1, 2011, 11 pages.

U.S. Appl. No. 12/019,335, filed Jan. 24, 2008, Office Action mailed May 23, 2011, 18 pages.

U.S. Appl. No. 12/544,484, filed Aug. 20, 2009, Office Action dated Jun. 3, 2011, 6 pages.

U.S. Appl. No. 11/969,343, filed Jan. 4, 2008, Office Action mailed Jun. 10, 2011, 13 pages.

Burger, E. et al., "Deploying CCXML for Application-Layer Call Control," Aug. 2006, 11 pages.

Kim et al., "Implementation of Third Party Based Call Control using Parlay Network API in SIP Environment," ICOIN 2003, LNCS 2662, 2003, pp. 416-425.

Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.

O'Doherty, Phelim, "JSLEE—SIP Servlet", <http://java.sun.com/products/jain/JSLEE-SIPServlet.pdf, 2003, 13 pages.

Romellini, C. et al., "CCXML: The Power of Standardization," Loquendo, Sep. 27, 2005.

The Parlay Group, "Specifications", <http://web.archive.org/web/20050114014707/www.parlay.org/specs/index.asp>, Jan. 14, 2005, 2 pages.

U.S. Appl. No. 11/848,347, filed Aug. 31, 2007, Advisory Action mailed Jul. 27, 2010, 3 pages.

U.S. Appl. No. 11/848,347, filed Aug. 31, 2007, Office Action mailed Sep. 30, 2010, 19 pages.

U.S. Appl. No. 11/877,129, filed Oct. 23, 2007, Notice of Allowance mailed Aug. 5, 2010, 6 pages.

U.S. Appl. No. 11/926,738, filed Oct. 29, 2007, Advisory Action mailed Sep. 3, 2010, 2 pages.

U.S. Appl. No. 11/926,738, filed Oct. 29, 2007, Non-Final Office Action mailed Nov. 10, 2010, 12 pages.

U.S. Appl. No. 11/943,101, filed Nov. 20, 2007, Office Action mailed Aug. 27, 2010, 11 pages.

U.S. Appl. No. 11/951,500, filed Dec. 6, 2007, Office Action mailed Sep. 1, 2010, 30 pages.

U.S. Appl. No. 10/855,999, filed May 28, 2004, Final Office Action dated Jan. 5, 2011, 19 pages.

U.S. Appl. No. 10/856,588, filed May 28, 2004, Advisory Action dated Jan. 5, 2010, 3 pages.

U.S. Appl. No. 10/856,588, filed May 28, 2004, Final Office Action dated Oct. 15, 2008, 11 pages.

U.S. Appl. No. 10/856,588, filed May 28, 2004, Final Office Action dated Oct. 20, 2009, 17 pages.

U.S. Appl. No. 10/856,588, filed May 28, 2004, Notice of Allowance dated Sep. 23, 2010, 8 pages.

U.S. Appl. No. 10/856,588, filed May 28, 2004, Office Action dated Mar. 16, 2009, 10 pages.

U.S. Appl. No. 10/856,588, filed May 28, 2004, Office Action dated Apr. 11, 2008, 16 pages.

U.S. Appl. No. 11/024,160, filed Dec. 27, 2004, Advisory Action dated Feb. 18, 2010, 3 pages.

U.S. Appl. No. 11/024,160, filed Dec. 27, 2004, Final Office Action dated Oct. 15, 2010, 11 pages.

U.S. Appl. No. 11/024,160, filed Dec. 27, 2004, Final Office Action dated Dec. 3, 2009, 11 pages.

U.S. Appl. No. 11/024,160, filed Dec. 27, 2004, Final Office Action dated Feb. 11, 2009, 9 pages.

U.S. Appl. No. 11/024,160, filed Dec. 27, 2004, Office Action dated Jun. 29, 2009, 9 pages.

(56) References Cited

OTHER PUBLICATIONS

U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Final Office Action dated Nov. 10, 2010, 18 pages.
U.S. Appl. No. 11/123,468, filed May 5, 2005, Advisory Action dated Jan. 18, 2011, 2 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
U.S. Appl. No. 12/364,642, filed Feb. 3, 2009, Non-Final Office Action dated Dec. 20, 2010, 18 pages.
U.S. Appl. No. 11/357,653, filed Feb. 16, 2006, Non-Final Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/848,347, filed Aug. 31, 2007, Final Office Action mailed Mar. 7, 2011, 21 pages.
U.S. Appl. No. 11/926,738, filed Oct. 29, 2007, Final Office Action mailed Mar. 17, 2011, 13 pages.
U.S. Appl. No. 11/943,101, filed Nov. 20, 2007, Final Office Action mailed Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/939,705, filed Nov. 14, 2007, Final Office Action mailed Mar. 17, 2011, 21 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/943,101, filed Nov. 20, 2007, Notice of Allowance mailed Dec. 9, 2011, 7 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Advisory Action dated Oct. 12, 2011, 3 pages.
U.S. Appl. No. 12/544,459, filed Aug. 20, 2009, Notice of Allowance mailed Aug. 22, 2011, 8 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
Author Unknown, "Assuring Quality of Experience for IPTV—White Paper," Heavy Reading, Jul. 2006, 18 pages.
U.S. Appl. 11/848,347, filed Aug. 31, 2007, Notice of Allowance mailed Mar. 2, 2012, 9 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.

(56) References Cited

OTHER PUBLICATIONS

U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 13/416,413, filed Mar. 9, 2012, Notice of Allowance mailed Oct. 2, 2012, 5 pages.
U.S. Appl. No. 12/544,471, filed Aug. 20, 2009, Final Office Action dated Jul. 30, 2012, 26 pages.
U.S. Appl. No. 11/357,653, filed Feb. 16, 2006, Final Office Action dated Sep. 21, 2012, 21 pages.
U.S. Appl. No. 12/364,642, filed Feb. 3, 2009, Advisory Action dated Sep. 14, 2012, 3 pages.
U.S. Appl. No. 11/070,317, filed Mar. 1, 2005, Notice of Allowance dated Sep. 4, 2012, 8 pages.
U.S. Appl. No. 11/951,500, filed Dec. 6, 2007, Notice of Allowance mailed Jul. 23, 2012, 7 pages.
3rd Generation Partnership Project 2, "Presence Service: Architecture and Functional Description", doc. No. 3GPP2 X.S0027-001-0, published on Sep. 2004, 32 pages.
Day, et al., "RFC 2778, A Model for Presence and Instant Messaging", published on Feb. 2000, 12 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/948,247, filed Nov. 17, 2010, Final Office Action mailed Feb. 11, 2013, 25 pages.
U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final Office Action mailed Mar. 20, 2013, 65 pages.
U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.

\* cited by examiner

SERVICE-ORIENTED ARCHITECTURE (SOA) MANAGEMENT OF DATA REPOSITORY

CROSS-REFERENCES TO RELATED APPLICATIONS

This application is related to U.S. patent application Ser. No. 11/926,738, filed Oct. 29, 2007, entitled "SHARED VIEW OF CUSTOMERS ACROSS BUSINESS SUPPORT SYSTEMS (BSS) AND A SERVICE DELIVERY PLATFORM (SDP)," which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the management of data across domains, an in particular to using workflows to manage data across multiple systems and sources.

As an ever increasing number of services is being offered by various network providers, there is a corresponding increase in the number of systems, devices, applications, and components that utilize and store data for customers. Data typically is stored in databases as either structured or unstructured data. Directories (e.g., Lightweight Directory Access Protocol (LDAP) directories) can be used to store the data, as well as various schemas. For XML data, for example, the data can be stored in XML-aware databases, and repositories such as are found in XDM servers allow storage and exchange of XML data. All these are particular examples of data repositories.

Existing systems do not provide a view or aggregation of data from other domains, where data manipulation can be accomplished, accompanied by, or conditioned by execution of a policy (i.e., any combination of any condition and any action) that may call other systems to perform tasks that may update or result into updates of the data as needed, and that provide a view of the updated results or that may call other systems to perform tasks as a result of the update. Typically, these other systems are the "master controller" or "owner" of the data that is viewed. Data manipulation then is typically done as a request to change data in a system, a security check or identity authentication/validation, and a change of data by the database or repository. Such approaches can lead to problems in that changes made in one system might not align or be consistent with other systems using the same data, or consistent with related data in the same or other systems.

Certain information thus overlaps or is related to other information stored for different services or in different repositories. Unfortunately, it is not practical for most entities to rewrite the schemas or redesign all the systems and services to use a common data model, single repository, single point of access, etc. As such, there typically is no way to treat the various repositories as a single data source that is readily available to applications, users, etc.

A significant problem thus exists in the fact that updating information in one data repository may require corresponding changes or updates in other repositories, with each repository storing information for multiple applications. In order to update data in a repository, the overall system assumes that several applications may have been triggered by the result, or at an intermediate step, and that these applications have executed their own processes may have changed the context or data elsewhere. For example, adding a subscription for a user in a Business Support System (BSS) may also require updating support data and asset data (e.g. in an OSS, Network, or run time environment like SDP), as well as ensuring that some provisioning, activation, fulfillment, and/or billing takes place, etc. If the data is allowed to be updated without following all such flows, data existing elsewhere (e.g. catalog or provisioning flows, new rates, inventories of assets associated to a principal (e.g. subscriber) or support details, etc.) may be dropped (i.e., not appropriately added/updated). Further, other data in the same repository that might need to be modified as a result of the change might not be modified appropriately. For example, an action such as creating a customer record in a customer database for a business such as a telecommunications service provider requires other updates or processes to be run for other systems, such as where a new customer must be added to the billing system in order to ensure that the customer will be billed for the service. The customer information must also be added to a support system so that the customer can receive necessary support, etc. It thus is not enough to simply update the information locally, but all other necessary processes also must be executed in response to the update.

For example, a telecommunications service provider typically maintains a large set of different repositories that each contain certain information about customers of that provider. A number of systems and components may include Business Support Systems (BSS), a Service Delivery Platform (SDP), Operational Support Systems (OSS), and various other applications, third party content, and services. Each of these systems typically includes at least one repository containing a specific type of information, which generally is not substantially related or available to information in the repositories of the other systems.

For example, a BSS repository can store customer information from a service provider (business) point of view, such as customer address information, customer billing information, products purchased by the customer, and campaigns to which a customer has responded. A BSS repository also can include subscription information for a customer, such as information for any voice, wireless, data, or roaming plan, as well as number of minutes purchased per month, the terms of the plan, SLA etc. Such information is treated as product information from a BSS (e.g. CRM) point of view, and the BSS repository also will include information as to whether a particular customer is subscribing to that product. If, for example, a customer subscribing to a new subscription may entitled to a new phone or promotion or phone renewal terms or bundling, etc., that information typically will be maintained in the BSS repository. A BSS (e.g. CRM) repository also typically is used to maintain trouble tickets, such as information regarding problems with service or failure to receive a form, status of the ticket etc.

An OSS repository, on the other hand, can be used for monitoring and administration of the system. An OSS repository can contain subscriber information such as information for the current and active bill for a customer, an inventory of assets, provisioning and activation status (i.e., what is activated, what needs to be activated, etc., such as an order fulfillment status) associated with a customer, types of products or services provided to a customer, etc. A repository at the network level might include current network information for a customer, such as whether the customer is logged onto the network, a location of the customer on the network, whether a customer device is active, presence (one may argue if that is network or service level data, but it does not matter), etc. An application/service level repository (e.g., exposed within a service delivery platform (SDP)) stores subscription information for a customer that is useful in running software services that are exposed to the customer, such as whether a particular customer has requested to receive news updates, and if so, also stores preference information such as which types of news the customer wishes to receive, e.g., international news or news related to a specific topic, as well as a channel in which to receive the news (e.g., SMS or MMS) and format information for the news (e.g., background color and font size). The SDP repository also can include information such as an identity for each customer, customer availability, etc.

As can be seen, there is certain information that overlaps or is related to other information stored for different services or in different repositories. Unfortunately, it is not practical for most entities to rewrite the schemas or redesign all the systems and services to use a common data model, single repository, single point of access, etc. As such, there typically is no way to treat the various repositories as a single data source that is readily available to applications, users, etc.

In the case of a service, when an update is to take place it often is difficult to know where information is located, which information needed to be updated, as well as anything else that may need to be updated in order to maintain consistency of the entire system. This can significantly slow access, use, and changes to data such as subscription data. Many initiatives to offer such capabilities either fail or are extremely difficult to implement and/or integrate within a service provider's domain.

Further, a problem exists in the fact that updating information in one data repository may require corresponding changes or updates in other repositories. If a specific repository includes customer subscription information, there can be multiple applications that write that information in the repository, and update the repository, so that the repository reflects the subscriptions for all services. For a business such as a telecommunications service provider, however, an action such as creating a customer record in a customer database requires other updates or processes to be run for other systems. For example, a new customer must be added to the billing system in order to ensure that the customer will be billed for the service. The customer information must also be added to a support system so that the customer can receive necessary support, etc. It thus is not enough to simply update the information locally, but all other necessary processes also must be executed in response to the update.

Even after a customer record is created in all the appropriate systems, the customer may subscribe to different services or purchase different equipment, which can require updates in any appropriate system. Thus it would be desirable to have a way to ensure that all appropriate processes and updates are launched in response to an update in data of any system or repository across a domain.

BRIEF SUMMARY OF THE INVENTION

Systems and methods in accordance with various embodiments are able to launch business processes when an authorized principal or process (e.g., an administrator, user, or application) attempts to update, create, modify, or delete a data field, whereby related processes, systems, repositories, or data fields can be updated or notified as needed. A checking that the requester of the manipulation is authorized may be part of the function(s) performed by processes resulting from such a request.

A system in accordance with one embodiment provides a common view or access point that provides for the updating of data, as well as the launching or processes that may or may not update data in ways that are tracked in a database, and/or may allow for other contextual impact. Such processing can occur across multiple systems or domains, including any data controlled by a set of business processes or other applications. A repository can be provided that aggregates the data to provide consistency when updated through the repository. The repository can interface with any systems own part of the data to request an update that the repository receives. At least one interface can be used to provide access to any information related to a given customer via a single repository or access point.

In one embodiment a virtual directory provides the ability to view all the data across various domains through a "virtual" view, or aggregated virtual views, of multiple data repositories, as well as any data that the system itself owns. This allows the data to be presented in a shared or common view for the user, but allows the data to remain in the "viewed" repository. An interface such as a single API can be used to provide access to multiple databases as if those databases were part of a common data source, and allows the information to be viewed as it the information was part of a single "virtual" directory. In creating the API, information from the various repositories can be aggregated with information coming from the service delivery platform.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments can overcome the aforementioned and other deficiencies in existing systems by launching business processes when an authorized principal or process such as a user or application attempts to update, create, modify, or delete a data field, whereby related processes, systems, repositories, or data fields can be updated or notified as needed.

A system in accordance with one embodiment provides a common view or access point that provides for the updating of data across multiple systems or domains, including not only data owned by a specific repository but any data controlled by a set of business processes or other applications. A repository can be provided that aggregates the data from multiple domains. The data then can be consistent, and can be consistently updated in the domains when updated through the repository. As the repository aggregates the data but at most owns only some of the data in at least one embodiment, the repository can interface with the systems owning any remainder of the data to request the update that the repository receives. At least one interface can thus be provided that allows a user to access any information related to a given customer via a single repository or access point.

One way in which this is achieved is through the use of a virtual directory, which provides the ability to view all the data across various domains. A virtual directory, or virtual database, exposes a "virtual" view, or aggregated virtual views, of multiple data repositories, as well as any data that the system itself owns. This allows the data to be presented in a shared or common view for the user, but allows the data to remain in the "viewed" repository. In some embodiments, the data may be at least partially cached in the virtual directory to improve the efficiency of the view. The cache itself may be distributed (e.g., using technology such as Oracle Tangosol Coherence available from Oracle Corporation of Redwood Shores, Calif.) or replicated (e.g., using times ten replication such as DB replication even RAC). For most repositories, including virtual repositories, a "north bound" interface is exposed to provision, load, or manage the data, using a Create Read Update Delete (CRUD) approach. In one example this is accomplished using a query language such as SQL applied on the repository or the target of the virtual repository, while any other such interface can be used as well. Another approach is to expose any XDM or LDAP capabilities.

Figure 1:
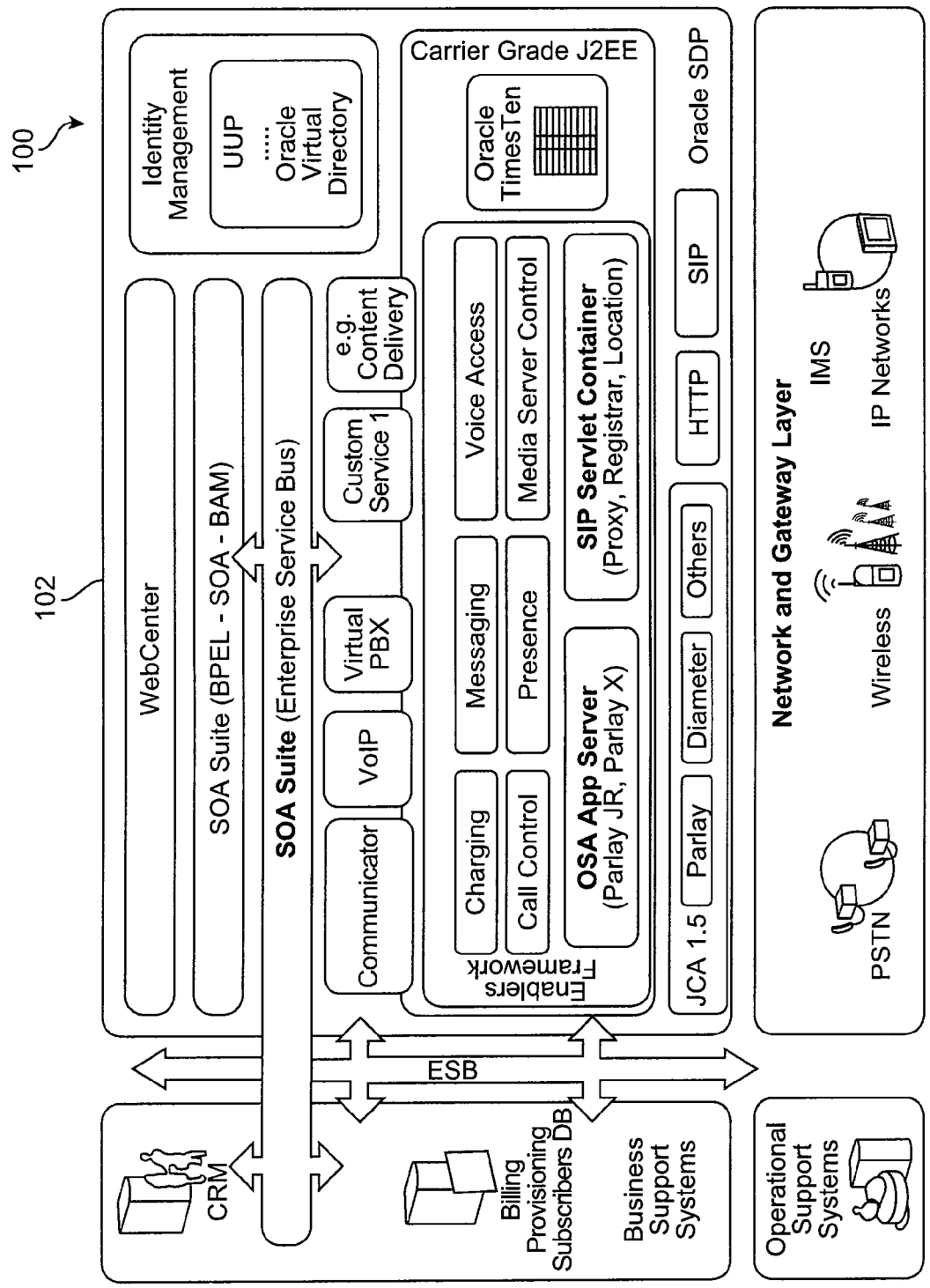
FIG. 1 illustrates a service delivery platform-based architecture that can be used with various embodiments of the present invention.
Figure 2:
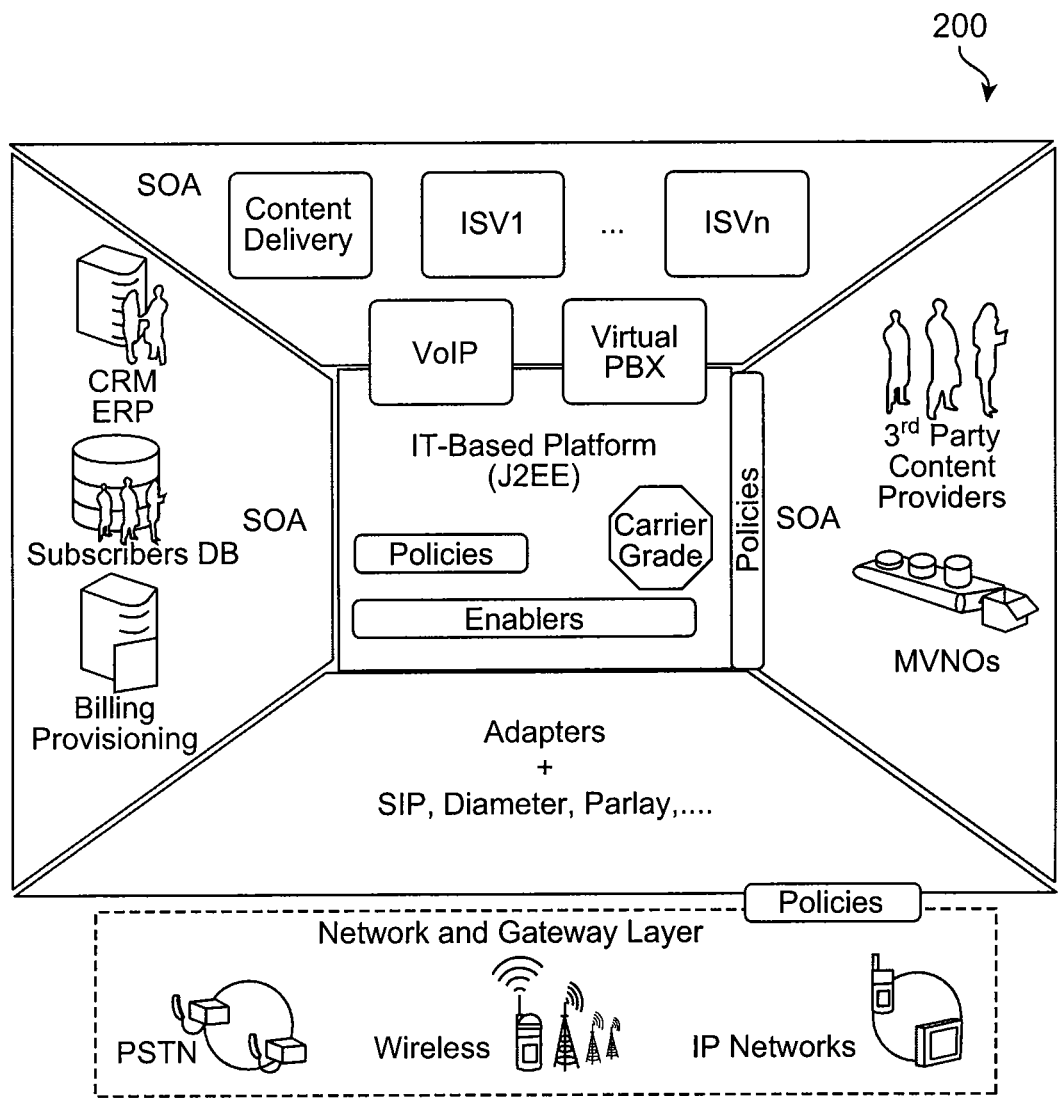
FIG. 2 illustrates a service delivery platform-based architecture that can be in accordance with one embodiment of the present invention.

In one embodiment, an interface such as a single API is used to provide access to multiple databases as if those databases were part of a common data source, and allows the information to be viewed as it the information was part of a single "virtual" directory. In some instances, the system itself may own at least part of the data. In creating the API, information from the various repositories can be aggregated with information coming from the service delivery platform (e.g. application context or result of calls to enablers/applications). As it is desirable for certain embodiments to function with existing technologies used by entities such as telecommunications companies, an exemplary implementation takes advantage of a service delivery platform (SDP)-based architecture 100, such as is illustrated in FIGS. 1 and 2, although it should be understood that such an approach is used for purposes of explanation only and that an SDP-based implementation is not required. In the exemplary architecture 100 of FIG. 1, the SDP 102 includes a horizontal, standards-based platform that abstracts the underlying network resources and follows a service-oriented architecture (SOA). Further information about such a service delivery platform is detailed in co-pending U.S. patent application Ser. No. 11/357,653, filed Feb. 16, 2006, entitled "FACTORIZATION OF CONCERNS TO BUILD A SDP (SERVICE DELIVERY PLATFORM)," which is hereby incorporated herein by reference. In one embodiment, the SDP utilizes a horizontal SOA platform based on the Java 2 Platform, Enterprise Edition (J2EE). can include information such as presence or location information for a customer.

It is likely that the identities used for each of the repositories will be different, even for a common customer. The SDP includes a converged container based on Java Specification Requests JSR 116/289 and JSR 32, which includes SOA SIP AS, OSA AS, and telephony AS as a J2EE converged container. The SDP also exposes mobile, voice, and other communications enablers.

In FIG. 2, the SDP configuration 200 implements the desired functionality on top of an underlying J2EE core provided by the application server. A basic approach to providing a service delivery platform starts with a standards-based IT platform (e.g., J2EE) and makes the platform carrier grade, and extends beyond HTTP to protocols such as SIP, Diameter, and Parlay. To support the key protocols relevant to Telecommunications, for example, the SDP can provide support for SIP/ISC, Diameter and Parlay CORBA as well as adapters to messaging gateways. A standard approach can be used to build adapters to any other resource or protocol using JCA 1.5, for example. Enablers are provided as reusable components that abstract the network resources and standard northbound interfaces. IT/SOA then can be used to provide services such as revenue generating services, utilizing SOA-based policies and business rules (e.g., from third parties). The platform then can provide for SOA-based integration of OSS, BSS, and SDP. Exposure to third party content and service provider can be achieved by SOA to expose, integrate and enforce policies. SOA also can be used to also support and rationalize policy management and evaluation throughout the service provider environment.

The SDP can be thought of as a service layer solution that can be deployed on Oracle fusion middleware/OC4J as well as JBOSS, BEA Weblogic, and IBM Websphere, for example. While SIP is described as a first class citizen protocol besides HTTP, other protocols can be supported out of the box using a recipe for JCA 1.5 adapters to Parlay CORBA, Diameter, Messaging protocols etc. The J2EE container is converged (i.e. every object from SIP, HTTP, J2EE object etc can share context and interact with each others, when it makes sense) and carrier grade (details provided after). This includes the use of TimesTen and open source technologies like JGroups, and also can be able to rely on Tangosol Coherence to provide session replication and efficient distributed cache. The enabler framework includes an OSA AS (i.e. Parlay JR 5.1 J2EE local interface and Parlay X 2.1). These are realized on SIP and Parlay JCA and can be realized on others as well. A JSR 116 SIP servlet converged container (SIP AS) can be used for IETF and IMS (ISC) deployments. The SIP servlet container also can include all the necessary components to deploy a vanilla IETF SIP network (i.e. proxy router, edge server, registrar/location, STUN server, support for ENUM server, application dispatcher).

A set of enablers can be provided and implemented on SIP and Parlay. These enablers can include, for example, a presence enabler that follows OMA SIP/SIMPLE Presence, XDM and RLS enabler specifications. It is an out of the box IMS presence server and SIP/SIMPLE presence server. It can also aggregate presence from other networks (e.g. Parlay network presence) and provide northbound parlay X interface for application to use presence without participating to the presence network. Location data can be modeled as a presence attribute using an extensible presence data model. A multi-channel A2P and P2A messaging enabler can allow for sending and receiving messages in channels like SMS, MMS, email, IM (XMPP), SIP and others. Enablers can allow for multimedia and multiparty call control over SIP (internet and IMS) as well as Parlay. Enablers can provide service level charging that exposes online, offline charging balance inquiry and tracking, pre-rated charging etc integrated to Ro/Rf (AAA media gateways), Parlay and Oracle BRM. Others can be similarly integrated via JCA 1.5 adapters to be developed by third parties. A media server control enabler and voice access enablers that are the MRFC functions of MRF are able to control a wide variety of voiceXML servers, IVRs, announcement servers, and media servers (e.g. MSML, MSCML, MSCP, and MGCP). Protocols not available out of the box can be built on SIP AS or using JCA 1.5.

In one embodiment, the service delivery platform (SDP) is a standards-based horizontal platform that abstracts the underlying network resources, follows a service-oriented architecture, and realizes OSE. The platform can be a SOA platform based on J2EE, which includes a J2EE converged container and exposes various communication enablers. Enablers can include, for example, call control enablers and media server control enablers as discussed elsewhere herein. Further, interfaces can be exposed to applications and other enablers and resources for usage of various functionality. Some or all of the interfaces can be standard or standardizable, as is its behavior, such as may include OMA, Parlay, Parlay X, and WS components. For the purpose of the SDP, these enablers can provide various MVC (Mobile/Voice/Communications) functionality. The applications can be built using one or more enablers, and can add notions like a user interface (UI), user management, and charging, either in the code or via delegation and orchestration.

It is likely that the identities used for each of the multiple repositories will be different, even for a common customer. An identity management tool is able to federate the identities across the various repositories, identifying different identifiers for a single user and mapping those identities to a unified identifier that allows a user or application to access any of the data in any of the repositories using just the unified identifier, as the identity management tool then can determine the appropriate identifier(s) to use for the necessary system(s). The identity management tool also can pull information for the customer from the various repositories using the unified profile information, and can present that information to the user or application in a virtual directory wherein the data appears to come from a single source.

Since access to the data is provided through a single access point in such a system, the virtual directory can be configured to launch a business process or workflow any time an attempt is made to update, create, or modify data in one of the data repositories from which the directory is gathering data. Such an approach can be policy based, in that a decision can be made through a combination of conditions and actions when to let the requests directly apply to the data and when to pass the flow elsewhere. For efficiency purposes, the changes to the data can sometimes be allows to take place directly when acceptable. This can still trigger policy notifications to data owner, who then still can run their own business processes/flows to ensure consistency and reconciliation, as well as cleansing or other business processes to take place accordingly. For example, if a user attempts to update a customer record with current address information, the virtual directory layer can "intercept" the update request and, instead of simply updating the address information in a customer records repository, the virtual directory can launch an appropriate workflow for the data field(s) to be updated. Various fields in the repositories can be associated with appropriate workflows, such that any time an operation is attempted on one of these fields, the appropriate workflow is launched. It also can be the case that an update is done and a flow or process is initiated as a result.

For the example where a user attempts to update address information for a customer, the user will attempt to update the information in the virtual directory. The virtual directory layer will then launch an "address update" workflow, or similar process, which can execute the appropriate business services, and notify the appropriate systems or repositories, whereby any system using the customer address, such as a billing system, operations system, or other system, will be updated accordingly. The workflow also then will update the appropriate field(s) in the customer records repository.

In some cases, the workflow may result in different data being written to the fields than was originally entered by the user or application, in modifying data owned by the system, or in a modifying of other data due to the effect of flows that have kicked in. For example, a customer might enter information for a new subscriber to a particular service. When a "new subscriber" workflow is launched, the workflow might detect that information for that customer already exists in a different database, such that the workflow can take any additional information from other repositories and utilize this information when ultimately updating the appropriate subscription database. In the event where a conflict comes up between information of different repositories, the workflow can cause a message to be generated for the user prompting the user to enter instructions for handling the conflict, or can initiate interaction with another application able to address the problem (e.g., starting an interaction with CRM in self service or with assistance of a CSR.

In an example where an application is attempting to create a new account, instead of simply storing new account information, a "new account" workflow is launched that may launch a customer relationship management (CRM) system and populate the CRM system with the new information, and the business process also will update any appropriate network information, address information, billing information, records information, or other appropriate information in other systems or repositories. Thus, instead of simply doing the intended database update, the system intercepts the request and launches a workflow that ultimately results in the intended change to the database, but also ensures that other appropriate changes are made throughout the system and across the domain(s).

In one example, when a user enters an instruction to add a record, the adding of the record is not realized by a database SQL operation of adding a record, but instead results in kicking off a workflow associated with that operation. In one embodiment the system kicks off a Business Process Execution Language (BPEL) workflow, which results in the query being modified so that instead of being a query to the database of the form "create a new record," the query essentially becomes a query to the OSS/BSS components to create a new customer. The OSS/BSS components, which can involve one or more complicated applications, essentially go through the logic and the necessary steps involved in creating a new customer. The creating of a new customer then also results in updating other systems, such as a support system and a billing system. Ultimately, the workflow results in creating the account for the customer, whereby the user can actually see that the account of the customer is created, but may not otherwise know that all the appropriate information in other systems also has been updated to reflect the new account.

The whole platform can be used with identity management services. In one example, a UUP (unified user profile) built on a Virtual Directory offers an identity managed single view of the information about the subscribers (or other principles) from OSS (e.g. assets in inventory), BSS (e.g. bill and subscriptions), network (e.g. HSS via Sh), Dynamic information (e.g. presence or location) and any other service level specific information (e.g. credentials, and application or enabler data).

Figure 3A:
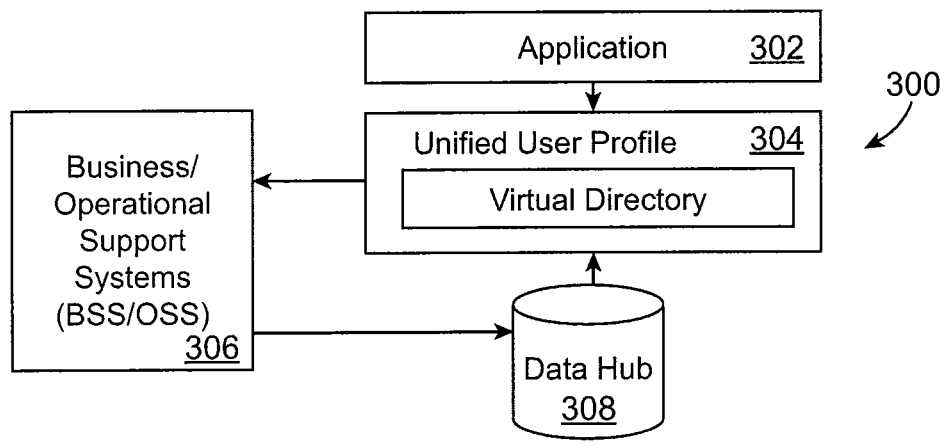
FIGS. 3(*a*) and 3(*b*) illustrate exemplary flows for an update request from an application in accordance with one embodiment of the present invention.
Figure 3B:
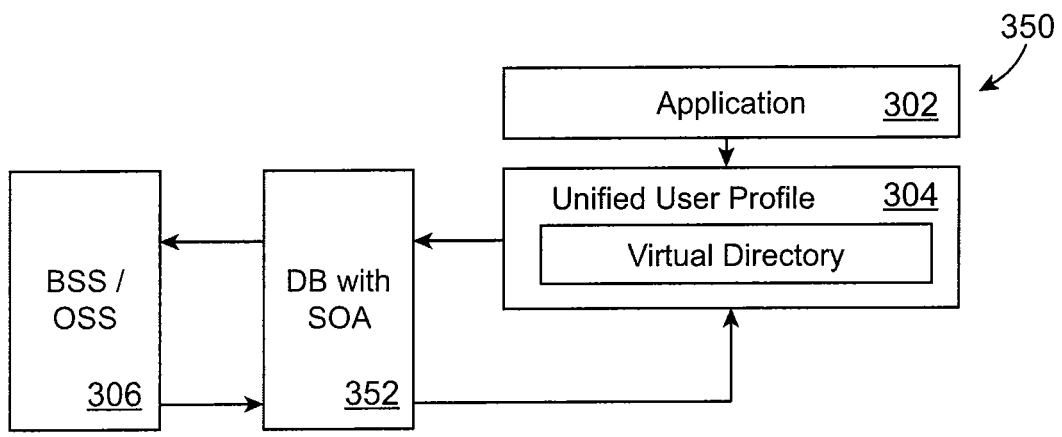

As illustrated in the exemplary flow 300 of FIG. 3(a), an application 302 can issue a command to create a new account in a UUP 304. Instead of updating the appropriate repository, however, the UUP component 304 causes a service-oriented architecture (SOA) workflow to be launched which creates a business process which interacts with the OSS/BSS 306 to initiate an update to the OSS/BSS-owned repository (or repositories). Once the OSS/BSS repository is updated, the workflow continues such that the resulting updates in the OSS/BSS repository are reflected in the data hub 308 and UUP 304, and reflected in the virtual directory, in lieu of the updates originally intended for the UUP. The end result seen by the application is the same, but any corresponding actions are taken care of by the workflow. FIG. 3(b) illustrates another exemplary flow 350 wherein the UUP component update the data in a database component with SOA capabilities 352, wherein the database component itself is able to trigger (possibly as result of an update) a workflow that creates a business process which interacts with the OSS/BSS 306.

It is always possible that an update operation might fail. For example, a user may wish to create an account for a user, and if the system simply used SQL to create the appropriate records then the account would be created. When using a workflow, however, it is possible that the customer information first would be directed to a financial system wherein the customer might fail a credit check, for example, which would cause the customer to not qualify for the selected service. In such a case, the account will not be created in the database.

In one example, the creation of an account triggers updates in rating and billing information for the account, as well as a list of support data, etc. There also can be an updating of data not seen in the SDP and typically not known by the applications. There may be assets that are not aggregated in the UUP, which can be a valid choice for a particular operator. The new service may result in the shipping of a new phone, modem, or set-top box, for example. The service also can be reflected in another repository, which would not have been updated if the change had been done straight to the repository without the flows. In another example, a user phone or modem must be provisioned and service activated when the subscriber adds a subscription, which is the result of a flow that would not have occurred if the data were simply updated directly. Further detail is contained in U.S. patent Ser. No. 12/019,335, filed Jan. 24, 2008, entitled "Integrating Operational and Business Support Systems with a Service Delivery Platform," which is hereby incorporated herein by reference.

The unified user profile can utilize a UUP Enabler that provides an identity managed virtual view of all data about principals or customers encountered in the SDP. This information can include, for example, credentials, BSS/Subscriptions (including the data hub and subscription management), service specific data, network information (e.g., HSS), dynamic information (e.g., presence and location information), OMA XDM profiles, and OMA GSSM information when available, for subscribers, users, customers, third parties, or any other appropriate parties.

The data management of the virtual directory or unified repository can be controlled so that an operation on some or all of the data is not performed as a simple data management operation, but instead is converted into a least one request that is passed to another system(s) that will act on the request in ways that should ultimately similarly affect the data, but may affect other data or the context for the data.

The UUP utilizes the managed identity to provide an identity managed virtual view of all data about principals or customers encountered in the SDP. This information can include, for example, credentials, BSS/Subscriptions (including the data hub and subscription management), service specific data, network information (e.g., HSS), dynamic information (e.g., presence and location information), OMA XDM profiles, and OMA GSSM information when available, for subscribers, users, customers, third parties, or any other appropriate parties.

The data management of a virtual directory (i.e., one way to implement the aggregated view aspect of the UUP) can be controlled so that an operation on some or all of the data is not performed as a simple data management operation, but instead is converted into a least one request that is passed to another system(s) that will act on the request in ways that should ultimately similarly affect the data, but may affect other data or the context for the data. Information about principals or customers encountered in the SDP can include, for example, credentials, BSS/Subscriptions (including the data hub and subscription management), service specific data, network information (e.g., HSS), dynamic information (e.g., presence and location information), OMA XDM profiles, and OMA GSSM information when available, for subscribers, users, customers, third parties, or any other appropriate parties.

Figure 4:
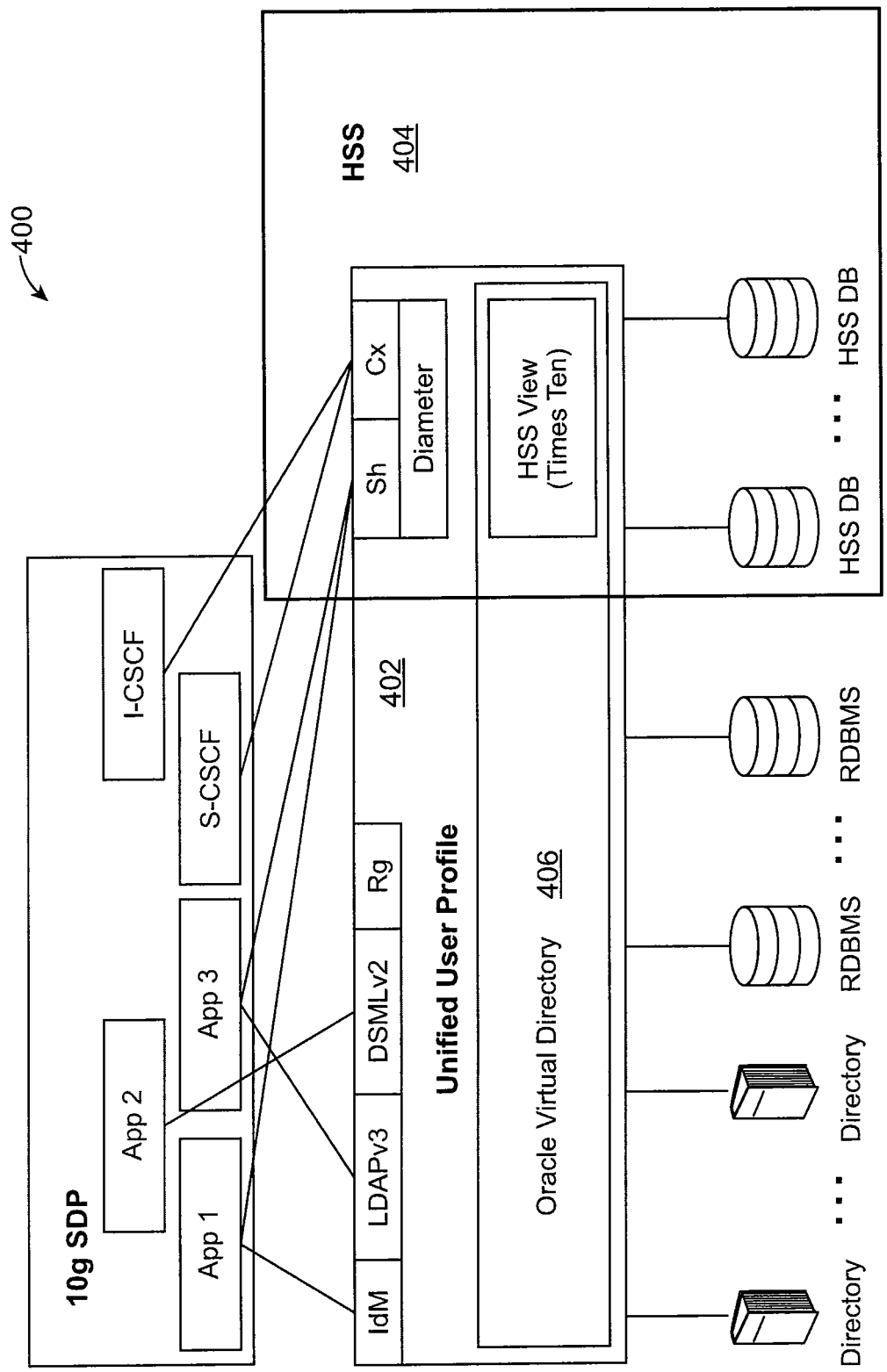
FIG. 4 illustrates an architecture utilizing a unified user profile and virtual directory in accordance with one embodiment of the present invention.

FIG. 4 illustrates an implementation 400 of a unified user profile (UUP) 402 and virtual directory 406, wherein the UUP provides various applications in the SDP with concurrent network access to various directories and repositories/database management systems across the domain. Concurrent access can be provided via various methods, such as by using Identity Management (IdM), Lightweight Directory Access Protocol (LDAP v3), Directory Services Markup Language (DSML v2), and Diameter Sh and Cx. The UUP can include a highly extensible user profile with support for application-specific dynamic user views, and can provide support for Home Subscriber Server (HSS) and Subscription Location Function (SLF) functionality. The user profile data can be managed using any appropriate data management system, such as the Oracle RDBMS server available from Oracle Corporation of Redwood Shores, Calif.

The UUP 402 also can be unified with a customer data hub in order to provide for all service-specific data, not just BSS information but also information such as privacy and preference information. The UUP also can overlap with dynamic data provided by Home Subscriber Server (HSS) 404 and Subscription Location Function (SLF) services, which can provide information such as presence and location information. By providing a common access point, the virtual directory provided by the UUP tool can also provide access to information such as account and billing information, subscription information, provisioning settings, and identity authorization and security information, for example. Identity management provided for the data hub through the UUP can include functionality such as single sign-on, identity federation, and anonymization. The authorization enabler and BSS can be used to provide for charging, messaging, and other functionality of an enabler framework via the identity management tool.

An advantage to such an approach is that the common view is not done from a schema or data aggregation point of view. While schemas can certainly be combined and used with various embodiments, there is no need to combine schemas or aggregate data into a single data repository. Embodiments are able to combine views of the various data sources into a common view via the virtual directory, effectively combining information for a user from the various sources across the BSS and runtime of the network without the need to change any schemas or existing data models. The schemas can all be different, but the common view and identity management can hide these differences.

Some telecommunications network providers offer multiple services to customers, including packages where services (e.g., voice, video, data, and wireless services) are bundled together in various combinations, where the customer can receive a single bill for the bundle. A provider also can offer a soft-client for broadband customers that combines presence, click-2-dial functionality, and instant messaging (IM), as well as identity management and cross-network features such as mid-call move.

In an example where a network provides network-aware presence information, a soft client can aggregate presence information across, for example, a personal computer (PC) and a network-enabled phone. If the user is available on the PC, the user can be sent an instant message, while if the user is available on the phone, a call can be made to the user's mobile phone number. The unified user profile thus can provide a shared view of identity information and present information across different networks, such as a Comcast DSL network for the PC and a Sprint network for the phone, and can update information for both systems using a workflow as described above.

In an example where a network allows for a mid-call move, a user can join a conference call from a VoIP phone (or soft client) over a broadband connection, for example, and 30 minutes into the call can enter a code such as *70 to transfer the call to the user's mobile. A conference application can automatically call the user cell phone in 30 seconds, and can make an announcement on the conference call that the user will rejoin in 30 seconds. Such functionality is possible due to the shared view and identity across the cable and mobile networks, and the ability to launch a workflow to interact with both. The user identity is managed/federated over the networks, even for different providers, but can allow the bill and preferences to be shared between the providers and networks. The charges also can reflect one service usage instance on the two networks, instead of a separate instance on each network.

In an example where a network allows for subscription management, a customer is signed up and subscribed to services via BSS, and the SDP/services are provisioned. A new feature is added to an update of the service based on presence of the customer. The service then can derive its behavior with respect to the customer by checking information such as the presence of the customer, HSS information, and the subscription and address information in the customer data hub.

In an example where a network allows for the maintenance of service specific data, a Content Delivery Suite (CDS) application is built as a set of flows using the SDP. Further information can be obtained by reviewing U.S. patent application Ser. No. 11/138,844, filed May 25, 2005, entitled "Platform and Service for Management and Multi-Channel Delivery of Multi-Types of Contents," which is hereby incorporated herein by reference. A content purchase history is stored in the UUP as service-specific information. The service-specific information can be available to many services of the CDS, such as a content management/DAM application for campaign and recommendations, BSS for marketing campaign designs, a third party portal to support reporting and/or auditing, a DRM application to determine if rights can be provided in answer to a request, download/delivery/streaming services to determine if a download is authorized, and a CRM process to analyze credit request or complaints. With managed federated identities (e.g., anonymization) third parties can access data for their own campaigns or recommendations while the service provider maintains the relationship with the subscriber.

In an example where a network allows for identity management using a UUP, an application can request user attributes, where the request uses an identity known by application per identity management. The request can follow an Identity Governance Framework (IGF) to which the UUP complies, whereby client information can be passed as requests as expected by the IGF.

In one embodiment, a single virtual data source of user identity includes "Northbound" interfaces (e.g., Java, SOAP/HTTP, LDAP, Diameter (Sh/Dh), Diameter (Cx/Dx), OMA GSSM, XCAP (OMA XDM profile enabler)) and "Southbound" protocols (e.g., LDAP, XCAP, JDBC, Diameter (Sh/Dh), Diameter (Cx/Dx), HSS, SLS, and FW to adapt to dynamic resources such as enablers, NW resources, and applications). The source can include various IMS profiles (schemas (TS 23.008) and schema extensibility), TMF SID/customer data model support (for both northbound and southbound), subscriber management features (e.g. as applications) including integration with OSS/BSS.

A system in accordance with various embodiments also can meet telecommunications-grade performance requirements, such as a throughput of 750,000 users per node, 30,000,000 users in a cluster, and a user profile size at least 15K to 20K (e.g., base IMS profile). A system also can have a latency in the 99th percentile, with look-up times of less than 5 ms, and high availability with no single point of failure, geographic redundancy, failover, active-active and active-passive topologies, and rolling upgrades. The system also can have local persistency in a distributed architecture. The system also can offer high interoperability, such as support for third party HSS, HLR, AuC with SLF; CSCF (Ericsson, Nokia); SIP A/S (WLSS, OCMS); and BSS/OSS systems/Data hub (e.g., Siebel). Such a system can ensure consistency of data and context instead of having inconsistent data due to data updates that do not otherwise ensure that other necessary data or other processes have been handled as needed.

In an exemplary application, data about the subscription and account information of a user is managed in the service provider environment through the BSS (Business Support System). The workflows generated can include specific action kick flows such as TeleManagement Forum (TMF) enhanced Telecom Operations Map (eTOM) flows. These flows perform actions that are stored in relevant data hubs regarding bills, subscriptions, accounts, etc. These flows may also kick other flows such as flows for a provisioning of resources, updates of inventories and catalogs, etc. Information updates then can be stored in the respective data hub.

Figure 5:
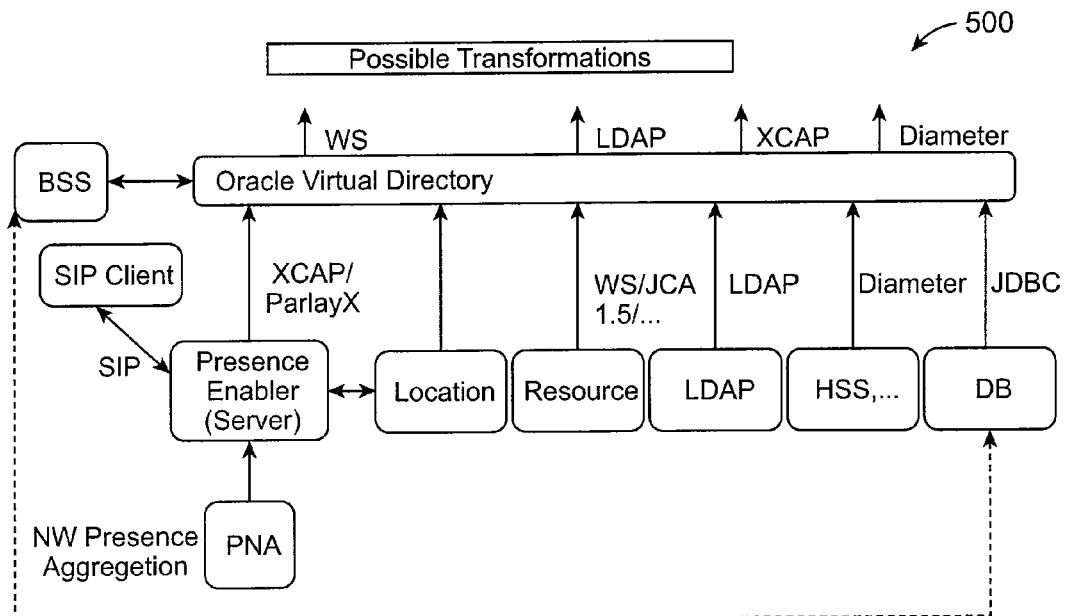
FIG. 5 illustrates an architecture utilizing a presence enabler in accordance with one embodiment of the present invention.
Figure 6:
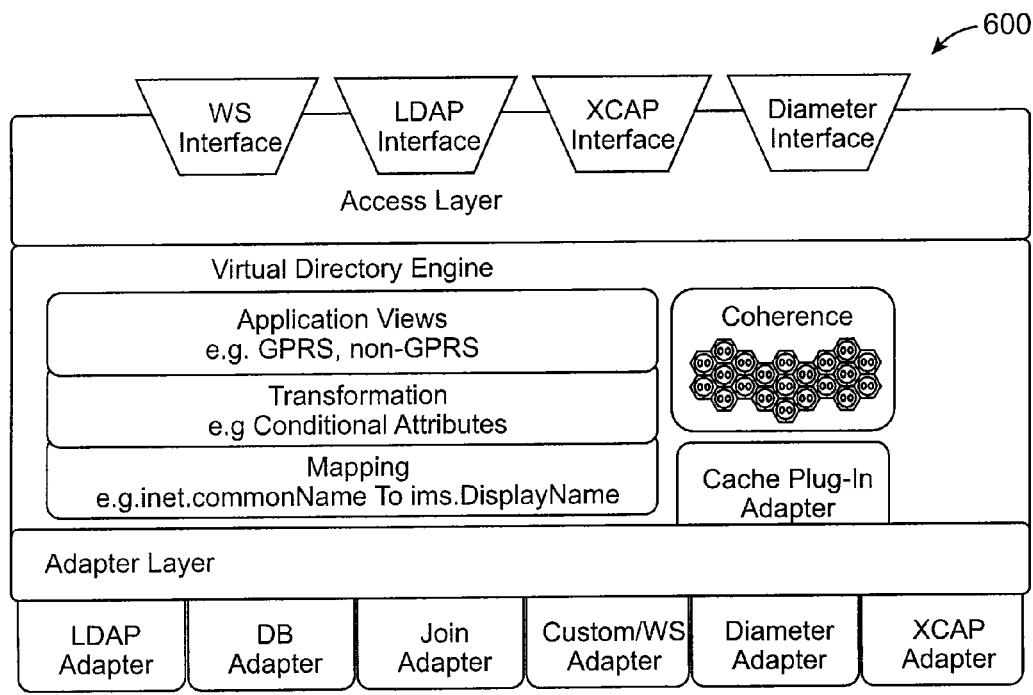
FIG. 6 illustrates an architecture utilizing an adapter layer in accordance with one embodiment of the present invention.

Integration also can allow for linking with the unified user profile to perform updates via the BSS/OSS systems. As illustrated in the exemplary architecture 500 of FIG. 5, the UUP (built on the virtual directory) is able to aggregate the view of items and delegate functions such as subscription management via calls to the BSS/OSS systems, which can perform the appropriate updates. Such an approach can utilize customizable schema mapping, and customizable distributed caching and pre-fetching. The northbound interfaces also can be wrapped and transformed as needed. Northbound interfaces can include Java, SOAP/HTTP, LDAP, Diameter, OMA GSSM, and XCAP interfaces, for example. Southbound protocols can include LDAP, XCAP, JDBC, Web service, and Diameter protocols, for example. FIG. 6 illustrates an exemplary UUP architecture 600 including an access layer, virtual directory layer, and adapter layer between the interfaces and system components.

Some vendors or operators today deploy subscriber management systems or mechanisms (e.g., architecture, schema, interfaces), such as are specified by standards bodies such as OMA, 3GPP, and TISPAN, specify subscription management mechanisms. These systems typically expose some subscription management to applications written by the service provider, third party developers, or at the level of the network, but none are integrated with various workflows (such as TMF flows). As a result, if an application creates an account or adds a subscription, for example, this information may be reflected in the data repository that may itself be shared with the OSS or BSS. However, flows are not activated to ensure updates are done and processes activated as necessary, and as a result other systems or data may not have been appropriately provisioned. As a result, the account may not have a bill record properly associated therewith. Further, a CRM or support system may not be aware of a user subscription to a service or particular settings and/or preferences, which can cause significant problems in the service provider domain.

Figure 7:
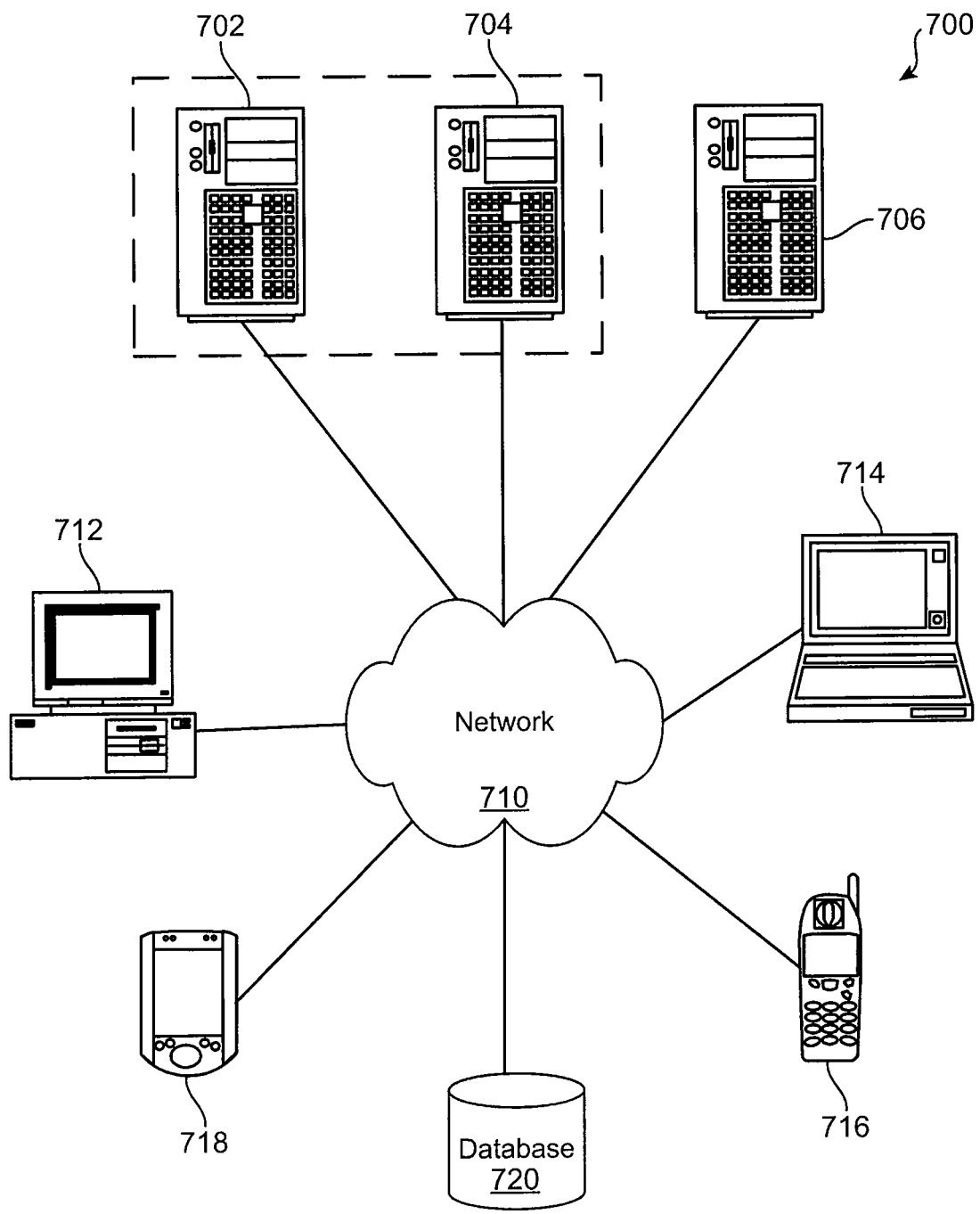
FIG. 7 illustrates components of a computer network that can be used in accordance with one embodiment of the present invention.

FIG. 7 is a block diagram illustrating components of an exemplary operating environment in which various embodiments of the present invention may be implemented. The system 700 can include one or more user computers, computing devices, or processing devices 712, 714, 716, 718, which can be used to operate a client, such as a dedicated application, web browser, etc. The user computers 712, 714, 716, 718 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 712, 714, 716, 718 may also have any of a variety of applications, including one or more development systems, database client and/or server applications, and Web browser applications. Alternatively, the user computers 712, 714, 716, 718 may be any other electronic device, such as a thin-client computer, Internet-enabled gaming system, and/or personal messaging device, capable of communicating via a network (e.g., the network 710 described below) and/or displaying and navigating Web pages or other types of electronic documents. Although the exemplary system 700 is shown with four user computers, any number of user computers may be supported.

In most embodiments, the system 700 includes some type of network 710. The network may can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 706) may be dedicated to running applications, such as a business application, a Web server, application server, etc. Such servers may be used to process requests from user computers 712, 714, 716, 718. The applications can also include any number of applications for controlling access to resources of the servers 702, 704, 706.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 712, 714, 716, 718. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 712, 714, 716, 718.

The system 700 may also include one or more databases 720. The database(s) 720 may reside in a variety of locations. By way of example, a database 720 may reside on a storage medium local to (and/or resident in) one or more of the computers 702, 704, 706, 712, 714, 716, 718. Alternatively, it may be remote from any or all of the computers 702, 704, 706, 712, 714, 716, 718, and/or in communication (e.g., via the network 710) with one or more of these. In a particular set of embodiments, the database 720 may reside in a storage-area network ("SAN") familiar to those skilled in the art. Similarly, any necessary files for performing the functions attributed to the computers 702, 704, 706, 712, 714, 716, 718 may be stored locally on the respective computer and/or remotely, as appropriate. In one set of embodiments, the database 720 may be a relational database, such as Oracle 10g, that is adapted to store, update, and retrieve data in response to SQL-formatted commands.

Figure 8:
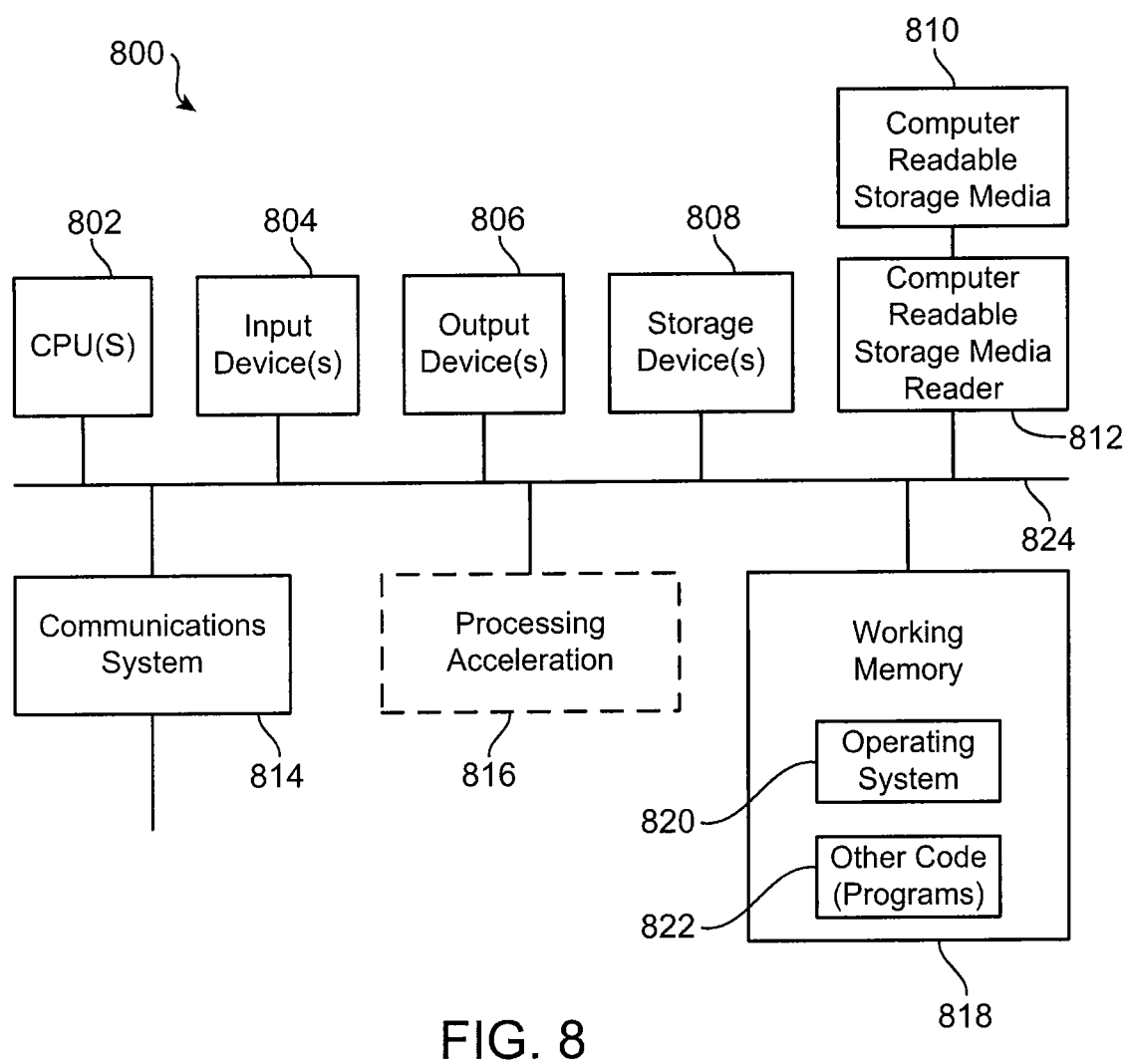
FIG. 8 illustrates components of a computerized device that can be used in accordance with one embodiment of the present invention.

FIG. 8 illustrates an exemplary computer system 800, in which various embodiments of the present invention may be implemented. The system 800 may be used to implement any of the computer systems described above. The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 812, a communications system 814 (e.g., a modem, a network card (wireless or wired), an infra-red communication device, etc.), and working memory 818, which may include RAM and ROM devices as described above. In some embodiments, the computer system 800 may also include a processing acceleration unit 816, which can include a digital signal processor DSP, a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information. The communications system 814 may permit data to be exchanged with the network and/or any other computer described above with respect to the system 800.

The computer system 800 may also comprise software elements, shown as being currently located within a working memory 818, including an operating system 820 and/or other code 822, such as an application program (which may be a client application, Web browser, mid-tier application, RDBMS, etc.). It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of managing data in a data system, comprising:
   executing by a Service Delivery Platform (SDP) a data management tool comprising an access layer providing an Application Program Interface (API) to one or more data management functions of the data management tool and a virtual directory layer providing a virtual directory representing a unified view of customer data related to a user of a service from each of a plurality of data repositories, each data repository within a different service domain of a plurality of service domains, each service domain controlled by at least one of a plurality of different data systems, wherein the customer data of each service domain comprises identity information for the user and information related to usage of the service of that domain by the user, wherein an identity of the user is different in each service domain, wherein the virtual directory federates the different identities of the user in the different domains by mapping the different identities to a unified identifier, and wherein the API of the virtual directory provides a single interface to the customer data from the plurality of service domains using the unified identifier;
   receiving at the SDP a request from an application to update target customer data represented in the virtual directory and using the unified identifier, the target customer data being owned by one of the data systems and the request comprising a request from the application made through the API of the data management tool in a protocol of the API; and
   launching by the SDP a business process in response to receiving the request, the business process being programmed to trigger at least one condition or action, or combination thereof, needed to update the target customer data represented in the virtual directory and related customer data in the plurality of service domains through the single interface of the virtual directory as a result of the request.

2. A method according to claim 1, wherein the request to update target customer data is further able result in at least one of triggering a workflow or policy that updates the customer data represented in the virtual directory, updating customer data and having a workflow triggered as a result, and causing a workflow or policy to be triggered that does not update the customer data represented in the virtual directory.

3. A method according to claim 1, wherein:
   the business process is programmed to trigger at least one condition or action, or combination thereof, for any of the multiple data systems needed to update the target customer data and any related customer data in the plurality of service domains in order to process the request.

4. A method according to claim 1, further comprising:
   generating by the SDP a notification when the target customer data and any related customer data is updated in response to the request.

5. A method according to claim 4, wherein:
   generating a notification includes displaying a message at the source of the request.

6. A method according to claim 1, further comprising:
   starting by the SDP a workflow to coordinate processing.

7. A method according to claim 1, further comprising:
   storing by the SDP customer data in one of a distributed cache and a replicated cache for processing.

8. A method according to claim 1, wherein:
   generating a notification is controlled by a policy.

9. A method according to claim 1, wherein:
   launching a business process includes kicking off a workflow selected the workflow is a service-oriented architecture (SOA)-based workflow.

10. A method according to claim 1, further comprising:
    obtaining by the SDP access to each of the plurality of data systems using a unified user profile the different identities for the user across the plurality of data repositories.

11. A method according to claim 1, wherein:
    a timing of an update of any related customer data relative to the updating of the target customer data is determined by a policy.

12. A method according to claim 1, wherein:
launching a business process further includes applying a policy to reconcile the target customer data with related customer data stored in the plurality of service domains.

13. A method according to claim 1, wherein:
the business process is operable to kick off a workflow that is a service-oriented architecture (SOA)-based workflow.

14. A method according to claim 1, further comprising:
maintaining by the SDP policies defining which operations and updates are executed by the business process.

15. A method according to claim 1, wherein:
the plurality of data systems includes at least one of each of a business support system (BSS), an operations support system (OSS), a billing system, and a subscription system.

16. A method according to claim 15, wherein:
the customer data of each domain is related to a subscription to the service of the domain; and
the customer data is viewed in the virtual directory as aggregated from the BSS and OSS systems.

17. A method according to claim 16, wherein:
requests to change the customer data related to the subscription are consistent with related customer data in the BSS and OSS systems.

18. A method according to claim 17, further comprising:
executing by the SDP at least one SOA workflow to delegate to the BSS and OSS systems to update the relevant customer data to ensure consistency.

19. A method according to claim 1, wherein:
any update to the target customer data and any related customer data occur in real time.

20. The method of claim 1, wherein the protocol of the API comprises one of Java, Simple Object Access Protocol (SOAP), Lightweight Directory Access Protocol (LDAP), Diameter, Open Mobile Alliance Global System for Mobile communication (OMA GSM), and XML Configuration Access Protocol (XCAP).

21. A system for managing data across multiple data systems, comprising:
a plurality of different data systems, each data system maintaining a different data repository of a plurality of data repositories and each data system within a different service domain of a plurality of service domains wherein each repository maintains customer data related to a user of the service of that service domain, wherein the customer data of each service domain comprises identity information for the user and information related to usage of the service of that domain by the user and wherein an identity of the user is different in each service domain; and
a Service Delivery Platform (SDP) executing a data management tool comprising an access layer operable to provide an Application Program Interface (API) to one or more data management functions of the data management tool and a virtual directory layer providing a shared, unified view of customer data from the plurality of data repositories that federates the different identities of the user in the different domains by mapping the different identities to a unified identifier and providing through the API a single interface to customer data from the plurality of different data repositories, the data management tool operable to receive a request from an application through the API to update target customer data represented in the virtual directory using the unified identifier, the request comprising a request from the application made through the API of the data management tool in a protocol of the API, the data management tool being programmed to launch a business process in response to receiving the request, the business process being programmed to trigger an action for any of the plurality of data systems needed to update the target customer data represented in the virtual directory and any related customer data in the plurality of different data repositories through the single interface of the virtual directory in order to process the request.

22. A computer-readable memory device having stored thereon a sequence of instructions which, when executed by a processor, cause the processor to manage data across multiple different data systems by:
executing a data management tool comprising an access layer providing an Application Program Interface (API) to one or more data management functions of the data management tool and a virtual directory layer providing a virtual directory representing a unified view of customer data related to a user of a service from each of a plurality of data repositories, each data repository within a different service domain of a plurality of service domains, each service domain controlled by at least one of a plurality of different data systems, wherein the customer data of each service domain comprises identity information for the user and information related to usage of the service of that domain by the user, wherein an identity of the user is different in each service domain, wherein the virtual directory federates the different identities of the user in the different domains by mapping the different identities to a unified identifier, and wherein the API of the virtual directory provides a single interface to the customer data from the plurality of service domains using the unified identifier;
receiving a request from an application to update target customer data represented in the virtual directory using the unified identifier, the target customer data being owned by one of the data systems and the request comprising a request from the application made through the API of the data management tool in a protocol of the API; and
launching a business process in response to receiving the request, the business process being programmed to trigger an action for any of the multiple data systems needed to update the target customer data and any related customer data in the plurality of different data repositories through the single interface of the virtual directory in order to process the request.

* * * * *

UNITED STATES PATENT AND TRADEMARK OFFICE
CERTIFICATE OF CORRECTION

| | |
|---|---|
| PATENT NO. | : 8,589,338 B2 |
| APPLICATION NO. | : 12/019299 |
| DATED | : November 19, 2013 |
| INVENTOR(S) | : Maes |

It is certified that error appears in the above-identified patent and that said Letters Patent is hereby corrected as shown below:

In the Specification,

In column 6, line 1, delete "(J2EE)." and insert -- (J2EE) --, therefor.

In column 13, line 52, delete "may can" and insert -- can --, therefor.

In the Claims,

In column 16, line 62, in Claim 10, delete "profile the different" and insert -- profile mapping the different --, therefor.

Signed and Sealed this
Eighth Day of September, 2015

Michelle K. Lee
*Director of the United States Patent and Trademark Office*